(12) United States Patent
Gandotra et al.

(10) Patent No.: US 11,792,033 B2
(45) Date of Patent: Oct. 17, 2023

(54) RESTRICTING CONTROL OF AN OUTPUT RESOURCE ADVERTISING SERVICES OPENLY OVER A WIRELESS NETWORK FOR PLAYING MEDIA

(71) Applicant: Fortinet, Inc., Sunnyvale, CA (US)

(72) Inventors: Sanjay Gandotra, Santa Clara, CA (US); Abhijith Kudupu Narayan, Sunnyvale, CA (US); Radhakrishnan Suryanarayanan, Fremont, CA (US)

(73) Assignee: Fortinet, Inc., Sunnyvale, CA (US)

( * ) Notice: Subject to any disclaimer, the term of this patent is extended or adjusted under 35 U.S.C. 154(b) by 290 days.

(21) Appl. No.: 14/982,726

(22) Filed: Dec. 29, 2015

(65) Prior Publication Data

US 2017/0005814 A1 Jan. 5, 2017

Related U.S. Application Data

(60) Provisional application No. 62/098,300, filed on Dec. 30, 2014.

(51) Int. Cl.

| | |
|---|---|
| *H04L 12/18* | (2006.01) |
| *H04W 4/16* | (2009.01) |
| *H04L 47/32* | (2022.01) |
| *H04L 45/42* | (2022.01) |
| *H04L 45/64* | (2022.01) |
| *H04W 84/12* | (2009.01) |

(52) U.S. Cl.
CPC ........ *H04L 12/185* (2013.01); *H04L 12/1818* (2013.01); *H04L 45/42* (2013.01); *H04L 45/64* (2013.01); *H04L 47/32* (2013.01); *H04W 4/16* (2013.01); *H04W 84/12* (2013.01)

(58) Field of Classification Search
CPC ... H04L 12/185; H04L 12/1813; H04L 45/42; H04L 45/64; H04L 47/32; H04L 65/403; H04W 4/16; H04W 28/06; H04W 84/12
USPC ......................................................... 709/205
See application file for complete search history.

(56) References Cited

U.S. PATENT DOCUMENTS

| | | | |
|---|---|---|---|
| 2005/0036509 A1* | 2/2005 | Acharya | H04L 63/0428 370/466 |
| 2014/0025816 A1* | 1/2014 | Otani | G06F 9/5072 709/225 |
| 2014/0029410 A1* | 1/2014 | Kannan | H04L 45/64 370/218 |
| 2015/0074741 A1* | 3/2015 | Janakiraman | H04L 63/101 726/1 |
| 2015/0256404 A1* | 9/2015 | Evans | H04L 67/16 709/224 |

\* cited by examiner

*Primary Examiner* — Kevin S Mai
(74) *Attorney, Agent, or Firm* — LAW OFFICE OF DORIAN CARTWRIGHT; Dorian Cartwright

(57) ABSTRACT

Restrictions to control of wireless resources shared openly on a wireless network for playing media are described. At a high-level, advertisement are broadcast for an openly shared resource service are restricted with respect to who, when and where control is permitted. A resource controller app can be implemented on a Wi-Fi controller, on an SDN controller, or as a separate server to intercept advertisements (e.g., service advertisements) being sent for broadcast by an openly shared resource. The advertisements are then transmitted over unicast according to specific parameters concerning specific users, devices, or locations, for example.

12 Claims, 8 Drawing Sheets

RESTRICTING CONTROL OF AN OUTPUT RESOURCE ADVERTISING SERVICES OPENLY OVER A WIRELESS NETWORK FOR PLAYING MEDIA

CROSS-REFERENCE TO RELATED APPLICATIONS

This application claims the benefit of priority under 35 U.S.C. 119(e) to U.S. Application No. 62/098,300, filed Dec. 30, 2014, entitled CONTROLLING AN OUTPUT RESOURCE SHARED OPENLY OVER A WIRELESS NETWORK FOR PLAYING MEDIA, by Sanjay GANDOTRA, et al., the contents of which hereby incorporated by reference in its entirety.

FIELD OF THE INVENTION

The invention relates generally to computer networking, and more specifically, to restricting control of a wireless resource advertising services over a wireless network for playing media.

BACKGROUND

Multimedia resources can now be easily made available to a wireless network using products such as Apple Airplay or Google Chromecast. These devices plug into a HDMI/USB port of a television or other device in order to connect through the wireless network to a content source. For example, a game, video or song played on an iPhone can be transmitted to the television for better viewing and sound. As zeroconf technologies, services of the television can be automatically discovered.

Problematically, services of the wireless resource are made available for connection by any device on the same network. For Apple Airplay, Bonjour service advertisements can be sent to a router or access point for broadcast to other connected devices. Those devices respond to the Bonjour service advertisement in order to take control of the television. Because there are no inherent restrictions built in to these technologies, different source devices may compete for control of the television at the same time, causing instability. In a business setting, a resource being wireless controlled in a meeting conducted in a conference room may be interrupted by competition for control of the device, even if unintentional.

Additionally, the freely available service advertisements give rise to network security vulnerabilities. Namely, rogue devices or processes are able to take control of a resource with malignant intentions.

What is needed is a technique to restrict control of a wireless resource according to specific parameters, such as who, what and where control is permitted.

BRIEF DESCRIPTION OF THE DRAWINGS

In the following drawings, like reference numbers are used to refer to like elements. Although the following figures depict various examples of the invention, the invention is not limited to the examples depicted in the figures.

SUMMARY

The shortcomings of the prior art are addressed by methods, (non-transitory) computer program products, and systems for restricting control of wireless resources shared openly on a wireless network.

Restrictions to control of wireless resources shared openly on a wireless network for playing media are described. At a high-level, advertisement are broadcast for an openly shared resource service are restricted with respect to who, when and where control is permitted. A resource controller app can be implemented on a Wi-Fi controller, on an SDN controller, or as a separate server to intercept advertisements (e.g., service advertisements) being sent for broadcast by an openly shared resource. The advertisements are then transmitted over unicast according to specific parameters concerning specific users, devices, or locations, for example.

Advantageously, wireless resources that natively share in an unrestricted manner can be contained as desired.

DETAILED DESCRIPTION

Computer hardware, (non-transitory) computer program products, and methods for restricting control of wireless resources shared openly on a wireless network are described. Resource control of a multimedia device at a meeting is used as an example context for utilizing the techniques though out this description only for the purpose of simplicity. Many other contexts are possible.

I. Systems to Control Wireless Resources (FIGS. 1A-1B)

Figure 1A:
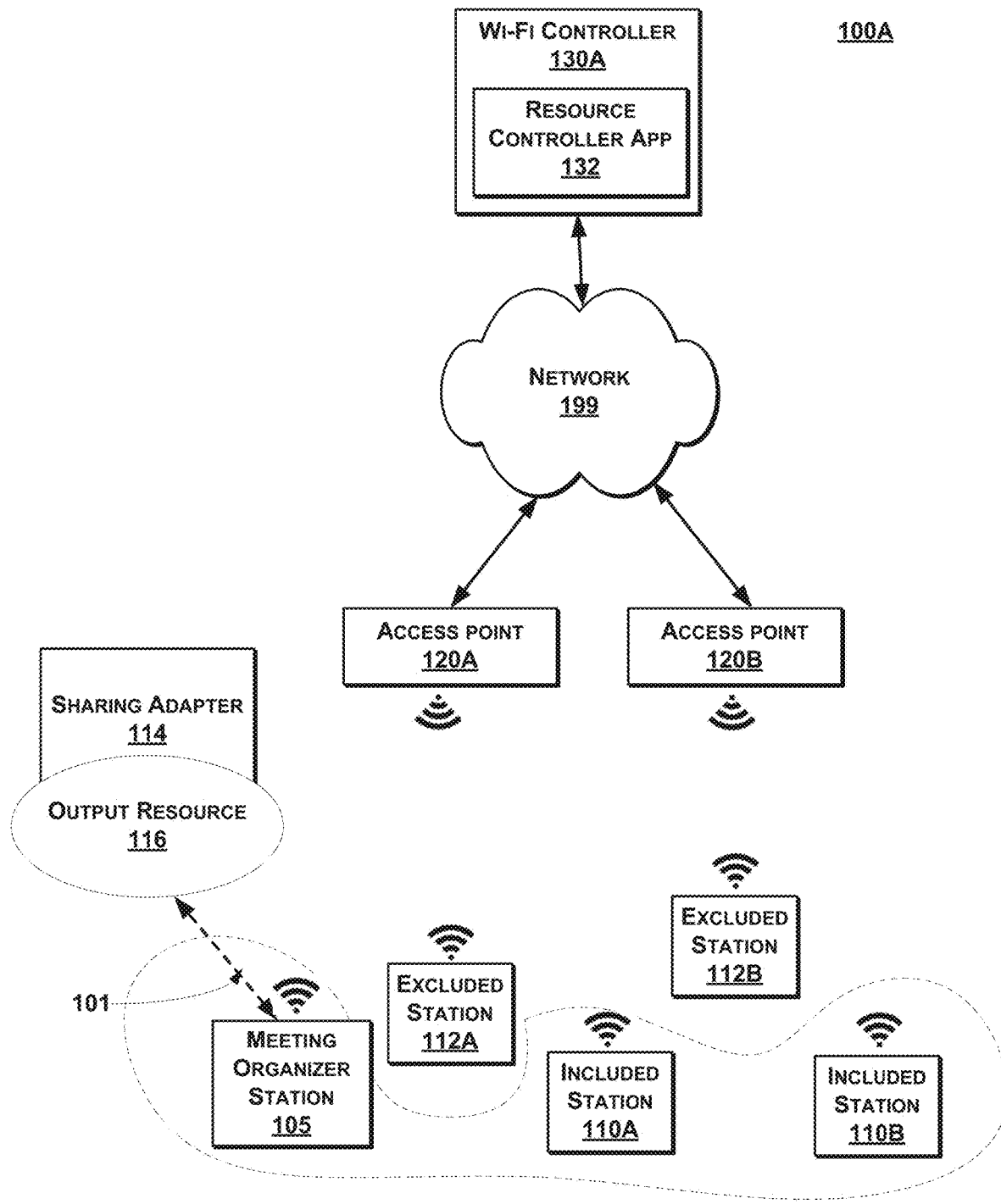
FIG. 1A is a high-level block diagram illustrating a system to restrict control of output resource shared openly on a wireless network, from a Wi-Fi controller, according to one embodiment.
Figure 1B:
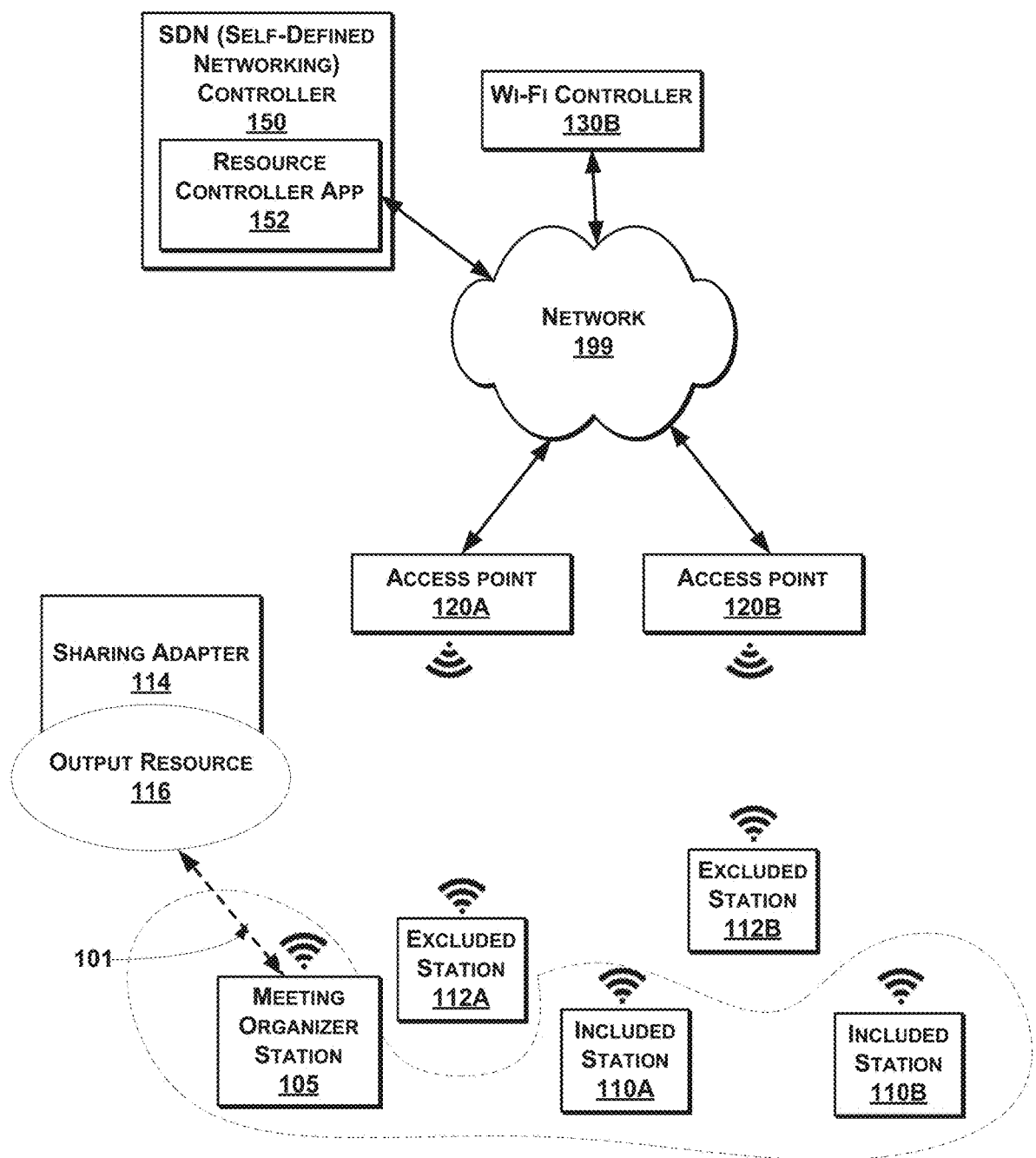
FIG. 1B is a high-level block diagram illustrating a system to restrict control of output resources shared openly on a wireless network, from an SDN (software-defined networking) controller, according to one embodiment.

Control of output resources can be implemented by a Wi-Fi controller 130A as shown in FIG. 1A or an SDN (software-defined networking) controller gateway 150 as shown in FIG. 1B, or combination of the devices and/or other devices on a wireless network. In additional embodiments implement restriction of control of output resources in a separate server. Alternatively, functionality can be remotely provided through a software-as-a-service (SaaS) cloud-based model.

More specifically, FIG. 1A is a high-level block diagram illustrating a system 100A to restrict control of openly shared wireless resources from the Wi-Fi controller 130A, according to one embodiment. The system 100A includes access points 120A-120B, and the Wi-Fi controller 130A forming a backbone network coupled to a network 199. Stations 105, 110A-110B, 112A-112B, and an output resource 116 connect to the backbone network through the access points 120A-120B. The network 199 can be a LAN, WAN, the Internet, a cloud-based network, a data network, a cellular network, a hybrid network, or the like. The system 100 is merely an example of many possible configurations which could include more or less access points, controllers, stations, and can also include well known components such as routers, switches, and firewalls.

The access points 120A-B discriminate access to and control of wireless resources. More specifically, the access points 120A-120B manipulates distribution of advertisements used to advertise the output resource 116 to just included station 110A in order to give exclusive control to a corresponding user. Control can be given all of the included stations 110A-110B or control can be passed from one station to another. In one embodiment, the access point 120A receives advertisements from the sharing adapter 114 on behalf of the output resource 116. The advertisements can be intended for open distribution by broadcast to all stations within range but, in turn are unicast or multicast per meeting configurations.

Rather than broadcasting the advertisements, the access point 120A sends advertisements to targeted stations, such as included station 110A which has been invited to a meeting. Additionally, the advertisements can be passed to the Wi-Fi controller 130A for further distribution to the access point 120B which forwards advertisements to included stations 110B-110C. Forwarded advertisements can be sent to one or more MAC addresses, all MAC addresses connected to a particular BSSID or VLAN. Once the advertisements are acknowledged, a connection between the included stations 110A-110B and the output resource 116 is facilitated. On the other hand, the access point 120A precludes excluded station 112A from receiving advertisements, as does the access point 120B with respect to excluded station 120B.

In general, the access points 120A-120B can individually represent one or more computing devices. For example, the access points 120A-120N can be an AP 110 or AP 433 (modified as discussed herein) by Meru Networks of Sunnyvale, Calif. Each access point 120A-120B is preferably connected to the network 199 (e.g., gateway, switch, router, hub, or another access point that is connected to the network 199) via a wired connection, but in some embodiments, such as a mesh network, the uplink connection is wireless. The access points 120A-120B can be set-up in various configurations to provide wireless coverage areas. In another embodiment, the functionality is incorporated into a switch or router.

The Wi-Fi controller 130A further comprises a access restriction app 132 to configure resource management in the access points 120A-120B. To enter configurations, a meeting organizer, a network administrator, or automated software program can log-on to the access restriction app 132 from a user interface or via APIs (application programming interfaces), in order to set up a specific meeting. Information for the meeting can include time, date, location, and invitees. Although the selected invitee can be an icon, the access restriction app 132 uses additional internal information to tie the icon to an individual station so that the access point can discriminate by device utilized by the invitee.

Prior to the meeting, the Wi-Fi controller 130A may direct the access point 120A ignore all advertisements because the meeting has yet to start. Consequentially, no one is able to control the output resource 116. Upon triggering (e.g., a certain time, host has arrived, quorum, etc.), the Wi-Fi controller 130A redirects the access point 120A by checking an access list and allowing service advertisements to be send to authenticated meeting attendees only. During the meeting, the meeting organizer may make dynamic changes as to who can control or view the output resource 116. If any of the triggering conditions are no longer met, the Wi-Fi controller 130A can again redirect the access point 120A accordingly.

For implementation, the access restriction app 132 can be integrated to the Wi-Fi controller 130A at an operating system level or installed as an application. Access to the access restriction app 132 can be directly through a wired connection to the Wi-Fi controller 130A (e.g., a USB connection), or remotely through a mobile app or other computing device. In alternative embodiments, the access restriction app 132 is installed to an access point for similar functionality. In still other embodiments, the soured provider app 132 is installed north of the Wi-Fi controller 130A as an independent server, as part of an applications server, from a cloud-based service operated by a third party, or the like.

The Wi-Fi controller 130A (e.g., an MC1500 or MC6000 device by Meru Networks of Sunnyvale, Calif. as described in U.S. application Ser. No. 13/426,703 filed Mar. 22, 2012 and commonly-assigned) provides centralized management for the access points 120A-120B. The Wi-Fi controller 130A can provide many other services to the network 199 such as virtual cell and virtual port functionalities (see further description in U.S. application Ser. No. 13/426,703, which is hereby incorporated by reference). Additional embodiments of the Wi-Fi controller 130A is set forth in more detail below in association with FIG. 3.

The output resource 116, via the sharing adapter 114, receives streaming media files from a networked device that stores, renders or retransmits the media in real-time. Examples include an Internet website, a YouTube video, a mobile app game, or a photo or video stream from a smart telephone or a connected wireless station's display. The output resource 116 can be a television, a computer monitor, a digital projector, an audio system, a smart phone, a hard drive or other storage medium, or any device capable of storing and/or playing back multimedia files. Returning to the meeting example, the slide presentation can be displayed through a projector in a conference room of a building to meeting attendees. In some implementations, the output resource 116 is mobile and can move transparently from the access point 120A to the access point 120B during a meeting, as enabled by the seamless mobility service of the Wi-Fi controller 130A.

Figure 2:
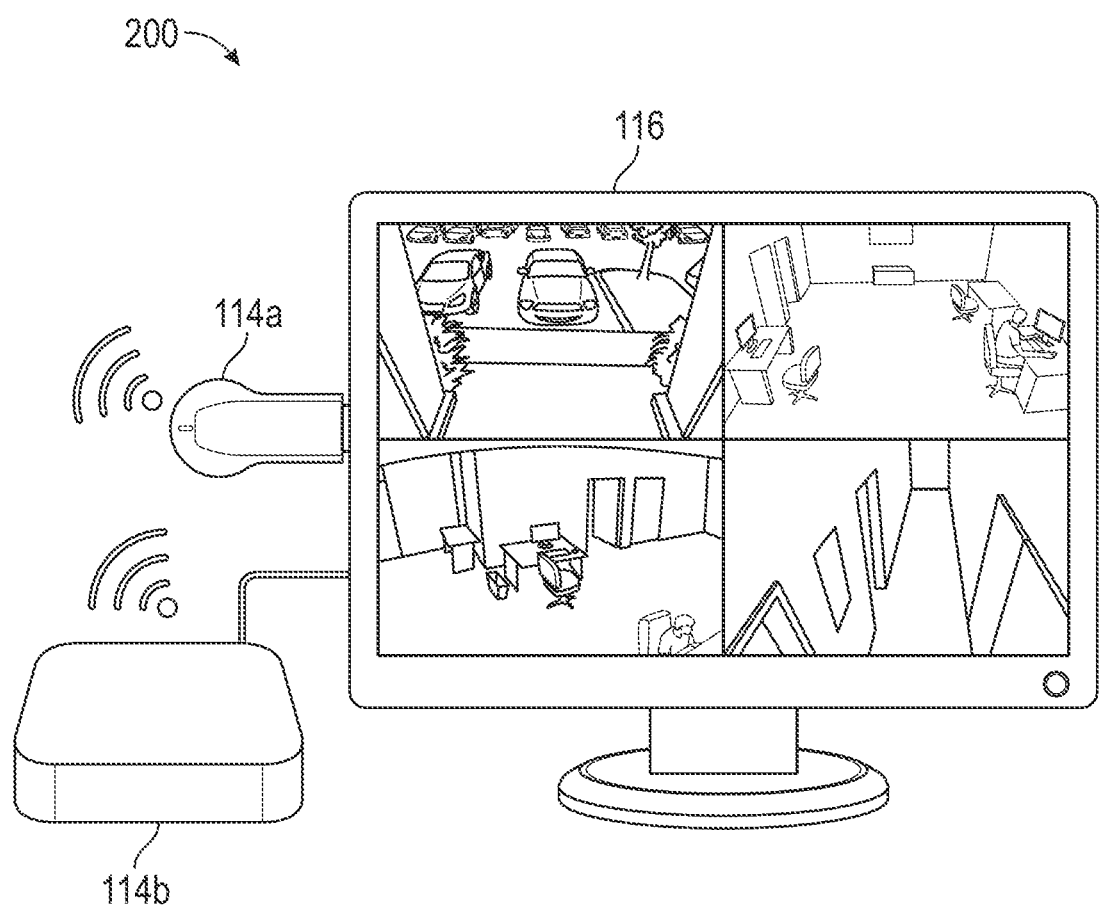
FIG. 2 is a schematic diagram illustrating an output resource shared openly in the systems of FIGS. 1A and 1B, according to an embodiment.

The sharing adapter 114 links the output resource 116 to the access point 120A for access by other meeting attendees. In an embodiment, the sharing adapter 114 comprises a small device that connects to an input of the output resource 116 and communicates with software installed on a media resource. The sharing adapter 114 attaches to the output resource 116 via USB, HDMI, mini-HDMI, FireWire, serial port, or the like. The sharing adapter 114 can also be wirelessly connected via a mesh network, Bluetooth connection, or external Wi-Fi network. In some embodiments, the sharing adapter 114 comprises logic or software code to facilitate wirelessly transmitting multimedia to the access point 120A. In some embodiments, the downstream advertisement discrimination is transparent to the sharing adapter 114 and, in other embodiments, cooperates in the process. In other embodiments, the sharing adapter 114 is integrated with the output resource 116 (e.g., a smart telephone broadcasting stored videos). More embodiments of the output resource 116 and the sharing adapter 114 are shown in FIG. 2.

The included stations 110A-110B represent meeting attendees, whether they be a particular device authenticated for the meeting or any device utilized by an individual with permissions for the meeting. The excluded stations 112A-112B represent devices that may ordinarily be able to receive advertisements from the output resource 116 but for the processes implemented herein. More generally, the stations 110A-110B, 112A-112B can be, for example, a personal computer, a laptop computer, a tablet computer, a smart phone, a mobile computing device, an Internet appliance, a non-wireless device modified to have wireless capabilities, or any other appropriate processor-driven computing device. A station is wirelessly coupled to an access point. No pre-configuration or client is needed, in an embodiment. In some embodiments, the station 110A-110B can be authenticated by a Radius server.

FIG. 1B is a high-level block diagram illustrating a system 100B to control wireless resources from the SDN controller 150, according to one embodiment. Relative to system 100A of FIG. 1A, the SDN controller 150 includes a source provide app 152 while the Wi-Fi controller 130B does not include the access restriction app 132. Some implementations may nonetheless be configured to include both of the access restriction apps 132, 152 in cooperation.

The SDN controller 150, in an embodiment, restricts wireless resource control using the OpenFlow or other protocol to directly implement layer 2 rules. More specifically, the SDN controller 150 directs the access points 120A-120B to drop advertisements using data plane rules (e.g., OpenFlow rules or any rules to directly affect routing decisions) to control data planes of the access points 120A-120B. OpenFlow provides cross-vendor communication as an abstraction of vendor-specific internal programming. In one embodiment, advertisements from the output resource 116 sent to the access point 120A are dropped, for example, before anyone has access to the output resource 116. In another embodiment, even when advertisements are sent from the access point 120A, the access point 120B can drop those advertisements for excluded station 112B. Further, advertisements that are received and processed by the access point 120A to be broadcast can be dropped on the transmission side by data plane rules.

More generally, the SDN controller 150 centralizes data plane decision-making for the access points 120A-120B. To do so, the access points 120A-120B are configured to concede layer 2 routing decisions to the SDN controller 150 by forwarding packets to the SDN controller 110 for routing instructions. The SDN controller can use input gathered across the network to make layer 2 routing decisions for the packets which are communicated back to the forwarding one of the access points 120A-120B. In one embodiment, routing decisions are made as a reaction to new or unknown flows. In another embodiment, access points are pre-configured by the SDN controller with rules for automatically implementing SDN controller 150 decisions on matching packets in the future. In still another embodiment, the rules or policies are distributed to the other network devices along a routing path for multi-hop data plane control.

The SDN controller 150 can be, for example, a personal computer, a laptop computer, a server, a cloud-based device, a virtual device, or the like implemented in any of the computing devices discussed herein. Various embodiments of the SDN controller 150 is set forth in more detail below with respect to FIG. 4.

FIG. 2 is a schematic diagram illustrating the output resource 116 shared openly in the systems of FIGS. 1A and 1B, according to an embodiment. In one embodiment, a sharing adapter 114A is plugged into a USB port of the output resource 116. In another embodiment, a larger capacity, sharing adapter 114B is connected by a cord to the USB port. Any appropriate data transfer protocol other than USB can be substituted. In turn, the access points 120A, 120B can be wirelessly coupled to the sharing adapter 114A.

Figure 3:
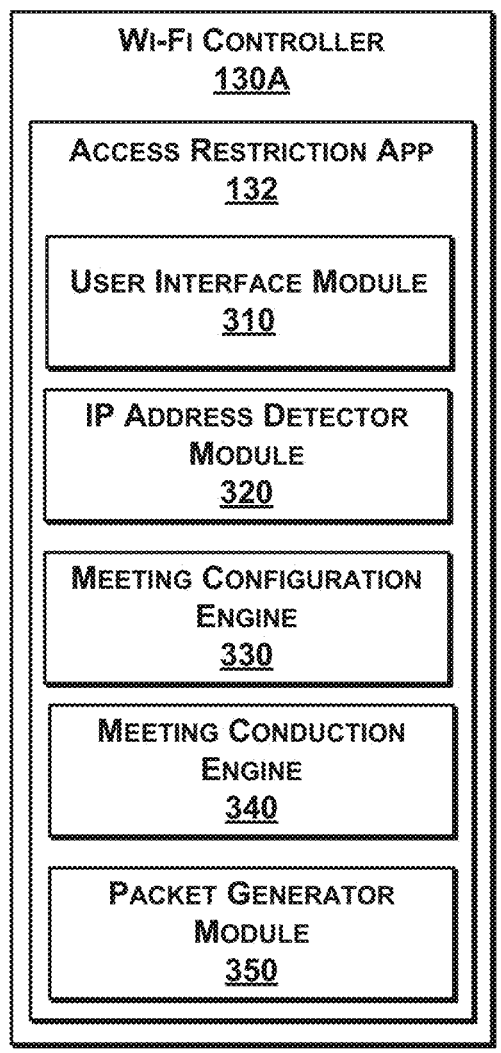
FIG. 3 is a more detailed block diagram illustrating a Wi-Fi controller of FIG. 1A, according to an embodiment.

FIG. 3 is a more detailed block diagram illustrating the resource controller app 132 of the Wi-Fi controller 130A of FIG. 1A, according to an embodiment. The Wi-Fi controller 130A includes a user interface module 310, an IP address detector module 320, a meeting configuration engine 330, a meeting conduction engine 340, and a packet generator module 350. The components can be implemented in hardware, software, or a combination of both.

The meeting configuration engine 330 implements restrictions to service advertisements in accordance with meeting parameters (e.g., the meeting parameters entered by the meeting organizer station 105 through the user interface module 310). In one implementation, rather than broadcasting advertisement frames sent from the sharing adapter, only meeting invitees are sent advertisements, effectively restricting others that do not receive custom data in the advertisements needed to connect. The advertisement received from the sharing adapter 114 can indicate an intention to broadcast by metadata settings in headers of advertisement frames. The metadata settings are modified at output to indicate unicast or multicast transmission, rather than broadcast transmission as initially set. In response, meeting attendees use the custom data in the advertisements to connect to the output resource 116.

The meeting conduction engine 340 implements meeting parameters, such as when a meeting occurs, duration, updates to invitees. The meeting conduction engine 340 also implements restrictions to control of the output resource 116 between invitees. The meeting organizer station 105 passes control of the output device 116 between invitees. In one embodiment, frames sent to control the output resource 116 from stations that do not currently have permission, are suppressed. The IP addresses passed from the IP address detector module 320 is compared against an IP address associated with one or more meeting attendees that have permission for resource control.

The user interface module 310 can provide access for the meeting organizer station 105, and other meeting organizers, to set up a meeting. A web page can have drop boxes, buttons, and input buttons to set up a time and place for the meeting. In response to where a meeting is being held, the Wi-Fi controller 130A uses management control over the access points 120A, 120B to implement the meeting parameters. If a meeting location is proximate to the access point 120B, there is no reason to transmit packets through the access point 120A. Thus, the output resource 116 is controlled by location. Times for transmitting packets are also controlled. In some embodiments, the user interface module 310 can also provide conventional processes of setting up a user account with a username and password, provide payments for services, customer support, and the like.

The IP address detector module 320 scans IP addresses (or other identifying information) of packets processed by the Wi-Fi controller 130A or the access points 120A. When IP addresses associated with sharing, such as the sharing adapter IP address is detected, certain actions are taken by the meeting configuration engine 330 and the meeting conduction engine 340, as described above. The packet generator module 340 modifies the metadata in the frames to change broadcast advertisements to unicast or multicast advertisements.

Figure 4:
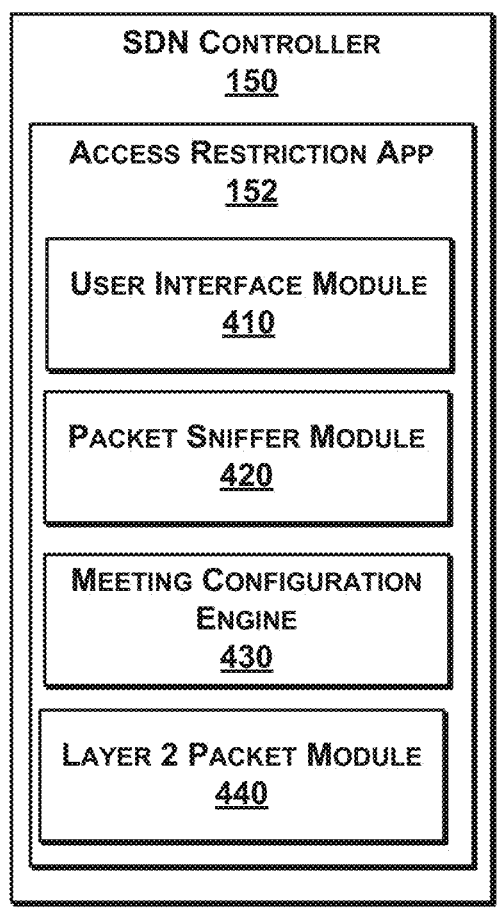
FIG. 4 is a more detailed block diagram illustrating a SDN controller of FIG. 1B, according to an embodiment.

FIG. 4 is a more detailed block diagram illustrating the resource controller app 152 of the SDN 150 controller of FIG. 1B, according to an embodiment. The SDN controller 150 comprises a user interface module 410, a packet sniffer module 420, a meeting configuration engine 430, and a layer 2 packet module 440.

The meeting configuration engine 430 of FIG. 4 utilizes OpenFlow rules to restrict meetings to invitees. One example generates OpenFlow rules that are sent to and executed at one or more of the access points 120A, 120B. When executed, layer 2 process can drop packets associated with excluded stations. Although packets are dropped in lower layers, a packet sniffer module 420 identifies packets to be restricted (or not) by examining contents of packets to identify sharing of the output resource 116. For example, multimedia packets can be detected, leading to an identification protocols, and the protocols can be indicative of resource sharing. Several consecutive frames can be examined for identifications.

The user interface module 410 can be similar to the user interface module 310 of the Wi-Fi controller 110A in some embodiments. The packet sniffer module 420 can use pattern recognition, application signatures, and other mechanism for identifying resource sharing from packet content. The layer 2 packet module 440 has data plane view of the network 199 rather than a control plane view of some Wi-Fi controllers. In performing layer 2 routing, packets can be dropped, duplicated, prioritized, or the like, based on OpenFlow rules.

II. Methods for Controlling Wireless Resources (FIGS. 5A-B)

Figure 5A:
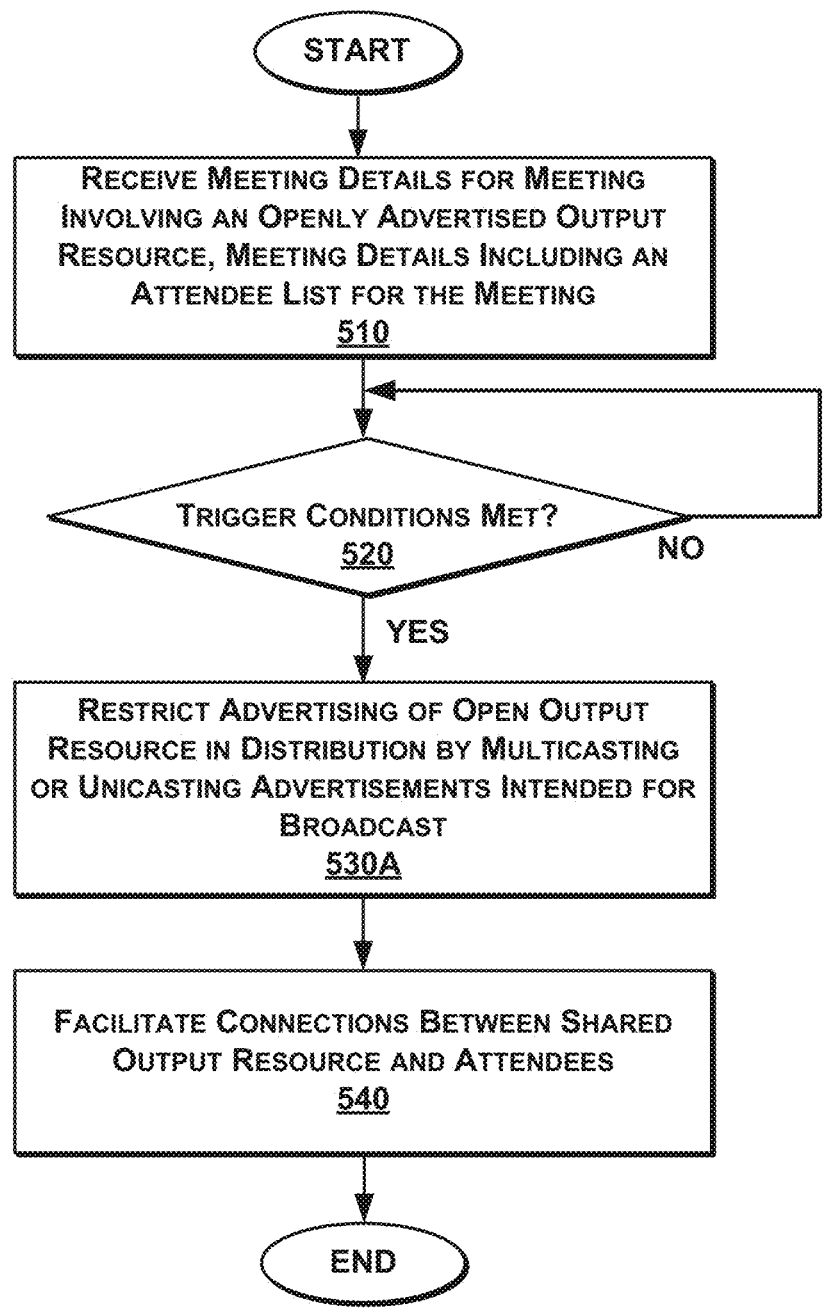
FIG. 5A is a block diagram illustrating a method for controlling wireless output resources from a Wi-Fi controller, according to one embodiment.

FIG. 5A is a block diagram illustrating a method 500A for controlling wireless output resources from a Wi-Fi controller (e.g., Wi-Fi controller 130A), according to one embodiment. One of ordinary skill in the art will recognize that the method 500A is non-limiting as other embodiments can have more or less steps and can be performed in a different order.

Meeting details can be received for a meeting that involves an openly advertised wireless resource (step 510). The meeting details can include an attendee list along with a date, time, location or other details that restrict who will have access to the wireless resource. When trigger conditions for the meeting are met (step 520), advertising of the open resource is restricted (step 530A). One manner of doing so is to convert advertisements intended for broadcast into multicast or even unicast messages to selected stations. Once the advertisement is received and acknowledged by the appropriate stations, connections between the shared resource and attendees can be facilitated (step 540). In some embodiments, a meeting organizer can pass control to a specific invitee and pass control to different invitees as needed, in substantially real-time.

Figure 5B:
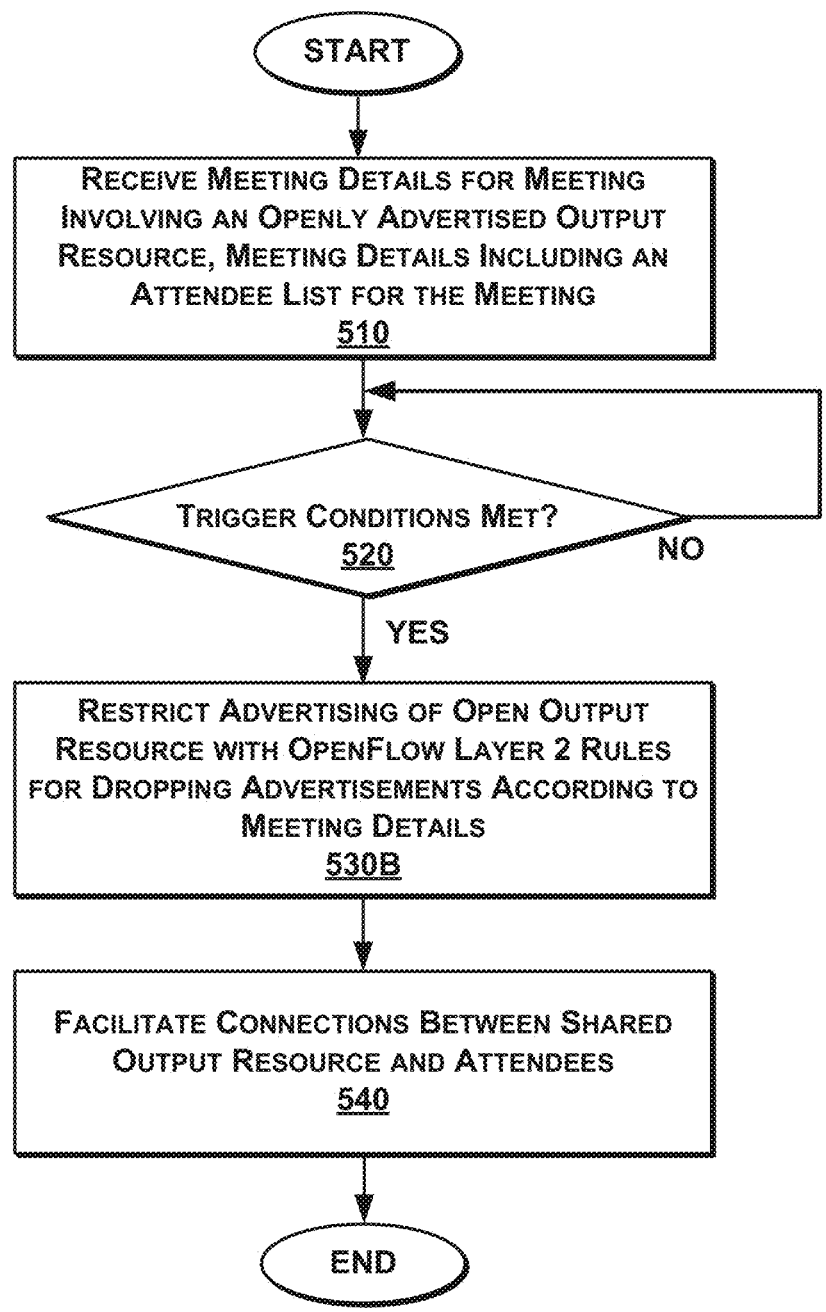
FIG. 5B is a block diagram illustrating a method for controlling wireless output resources from an SDN controller, according to one embodiment.

FIG. 5B is a block diagram illustrating a method for controlling wireless output resources from an SDN controller (e.g., SDN controller 150), according to one embodiment. Relative to method 500A of FIG. 5A, when trigger conditions for the meeting are met (step 520), advertising of the open resource is restricted with OpenFlow rules (step 530B). For instance, advertisements can be dropped using data plane condition such as source address and/or destination address.

III. Generic Computing Device (FIG. 6)

Figure 6:
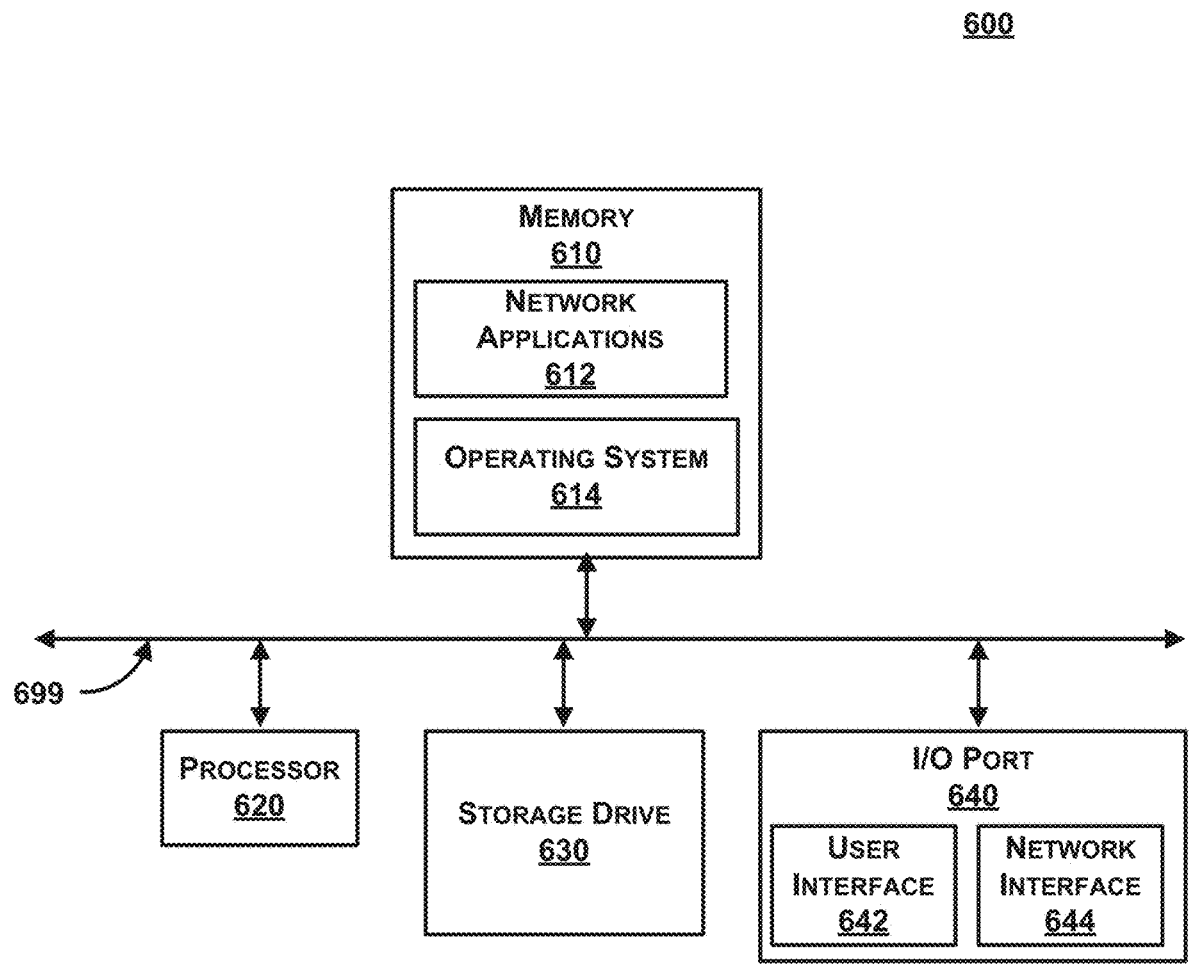
FIG. 6 is a block diagram illustrating an exemplary computing device, according to one embodiment.

FIG. 6 is a block diagram illustrating an exemplary computing device 600 for use in the system 100 of FIG. 1, according to one embodiment. The computing device 600 is an exemplary device that is implementable for each of the components of the system 100, including Wi-Fi controller 110, the access points 120A, 120B, and the stations 130A-130C. The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog, and use any suitable protocol.

The memory 610 further comprises network applications 612 and an operating system 614. The network applications 612 can include the modules of the SDN controller access point 110, the access points 120A, 120B, the cloud-based Wi-Fi controller 140, or the station 130, as illustrated in FIGS. 1A-4. Other network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 620 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630

The storage drive 630 can be any non-volatile type of storage such as a magnetic disc, EEPROM, Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

IV. Additional Embodiments

Generally, one of ordinary skill in the art will recognize that the examples set forth herein are non-limiting and only illustrative of widely-applicable principles. For example, although configuring wireless resources for a meeting in a conference room is referred to throughout the description, one of ordinary skill in the art with recognize how the general principles can be applied to many different circumstances. For example, wireless resources can be according to other parameters such as device type, performance, a classroom, an outdoor area, a home address, and restricted per age. Further, restrictions can be made until a payment is received, or for a dynamically changing groups of people or devices.

Accordingly, this description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method, in an SDN (software-defined networking) controller device of a data communication network that manages a plurality of access point devices utilizing OpenFlow rules for cross vendor compatibility, for improving network performance by restricting control of an output resource shared openly on the data communication network to invitees with OpenFlow rules, the method comprising the steps of:

receiving, at a network interface of the controller device, data to configure a meeting involving the output resource, for one or more invitees representing a subset of the available invitees;

receiving, at the network interface, a service advertisement from the output resource, the output resource connected to a Wi-Fi portion of the communication network through an access point of the one or more access points, the service advertisement indicative of availability for connection to the output resource and control of the output resource and comprising one or more frames with an indication that the service advertisement should be broadcast;

responsive to the received service advertisement, determining, at a processor of the controller device, frame delivery information associated with the one or more invitees;

modifying, at the processor, the service advertisement based on the determined frame delivery information;

transmitting, from the network interface, the modified service advertisement to the one or more invitees associated with the plurality of access points; and subsequently restricting content to the output resource to the one or more invitees with Open Flow by:

transmitting, from the SDN controller device, an OpenFlow rule executed at a layer-2 data plane specifying service advertisement frames to be dropped at the access point after being broadcast; and suppressing, at the access point implementing the OpenFlow rule generated at the Wi-Fi controller, service advertisements from being broadcast to excluded stations at the plurality of access points, wherein frames are dropped from a data plane based on the OpenFlow rule by the plurality of access points, wherein the output resource displays content provided by an invitee device when under control of the invitee device, and the output resource moves transparently during a meeting from the access point to a second access point of the plurality of access points.

2. The method of claim 1, wherein the data received to configure a meeting comprises at least one from the group of:

an identification for each of the invitees;

when the meeting will occur; and where the meeting will occur.

3. The method of claim 1, wherein the output resource comprises:

a sharing adapter coupled to the output resource to provide network connectivity, wherein the network device is not inherently capable of network connectivity.

4. The method of claim 1, wherein suppressing service advertisements comprises:

converting the received advertisement from a broadcast transmission to a unicast transmission sent to each invitee.

5. The method of claim 1, wherein suppressing service advertisements comprises:

dropping frames having a source IP address that is not associated with one of the invitees.

6. The method of claim 1, further comprising:

receiving data from a meeting organizer station indicative of which invitee of the one or more invitees controls the output resource.

7. The method of claim 1, further comprising:

receiving data from the meeting organizer station indicative of a change of which invitee of the one or more invitees controls the output resource.

8. The method of claim 1, wherein:
the one or more access points associate with the plurality of stations over the Wi-Fi portion of the communication network for data transfer services utilizing the communication network.

9. The method of claim 1, wherein the access points operates according to at least one of IEEE 802.11n, IEEE 802.11 ac wave 2, and a Wi-Fi protocol that supports beamforming.

10. A non-transitory computer-readable medium storing source code that, when executed by a processor, performs a method in in a Wi-Fi controller device of a data communication network that manages a plurality of access point devices utilizing OpenFlow rules for cross vendor compatibility, for improving network performance by restricting control of an output resource shared openly on the data communication network to invitees with OpenFlow rules, the method comprising the steps of:
receiving, at a network interface of the controller device, data to configure a meeting involving the output resource, for one or more invitees representing a subset of the available invitees;
receiving, at the network interface, a service advertisement from the output resource, the output resource connected to a Wi-Fi portion of the communication network through an access point of the one or more access points, the service advertisement indicative of availability for connection to the output resource and control of the output resource and comprising one or more frames with an indication that the service advertisement should be broadcast;
responsive to the received service advertisement, determining, at a processor of the controller device, frame delivery information associated with the one or more invitees;
modifying, at the processor, the service advertisement based on the determined frame delivery information;
transmitting, from the network interface, the modified service advertisement to the one or more invitees associated with the plurality of access points; and
subsequently restricting content to the output resource to the one or more invitees with Open Flow by:
transmitting, from the Wi-Fi controller device, an OpenFlow rule executed at a layer-2 data plane specifying service advertisement frames to be dropped at the access point after being broadcast; and
suppressing, at the access point implementing the OpenFlow rule generated at the Wi-Fi controller, service advertisements from being broadcast to excluded stations at the plurality of access points, wherein frames are dropped from a data plane based on the OpenFlow rule by the plurality of access points,
wherein the output resource displays content provided by an invitee device when under control of the invitee device, and the output resource moves transparently during a meeting from the access point to a second access point of the plurality of access points.

11. An SDN (software-defined networking) controller device of a data communication network that manages a plurality of access point devices utilizing OpenFlow rules for cross vendor compatibility, for improving network performance by restricting control of an output resource shared openly on the data communication network to invitees with OpenFlow rules, the Wi-Fi controller device comprising:
a processor;
a network interface, communicatively coupled to the processor and to the data communication network, to receive data to configure a meeting involving the output resource, for one or more invitees representing a subset of the available invitees,
wherein the network interface to receive a service advertisement from the output resource, the output resource connected to a Wi-Fi portion of the communication network through an access point of the one or more access points, the service advertisement indicative of availability for connection to the output resource and control of the output resource and comprising one or more frames with an indication that the service advertisement should be broadcast;
wherein the processor, responsive to the received service advertisement, determines frame delivery information associated with the one or more invitees,
wherein the processor modifies the service advertisement based on the determined frame delivery information;
wherein the network interface transmits the modified service advertisement to the one or more invitees associated with the plurality of access points, and
wherein the processor subsequently restricting content to the output resource to the one or more invitees with Open Flow by:
transmitting, from the SDN controller device, an OpenFlow rule executed at a layer-2 data plane specifying service advertisement frames to be dropped at the access point after being broadcast; and
suppressing, at the access point implementing the OpenFlow rule generated at the Wi-Fi controller, service advertisements from being broadcast to excluded stations at the plurality of access points, wherein frames are dropped from a data plane based on the OpenFlow rule by the plurality of access points,
wherein the output resource displays content provided by an invitee device when under control of the invitee device, and the output resource moves transparently during a meeting from the access point to a second access point of the plurality of access points.

12. A non-transitory computer-readable media storing source code that, when executed by a processor, performs a method in an SDN (software-defined networking) controller device of a data communication network that manages a plurality of access point devices utilizing OpenFlow rules for cross vendor compatibility, for improving network performance by restricting control of an output resource shared openly on the data communication network to invitees with OpenFlow rules, the method comprising the steps of:
receiving, at a network interface of the controller device, data to configure a meeting involving the output resource, for one or more invitees representing a subset of the available invitees;
receiving, at the network interface, a service advertisement from the output resource, the output resource connected to a Wi-Fi portion of the communication network through an access point of the one or more access points, the service advertisement indicative of availability for connection to the output resource and control of the output resource and comprising one or more frames with an indication that the service advertisement should be broadcast;
responsive to the received service advertisement, determining, at a processor of the controller device, frame delivery information associated with the one or more invitees;

modifying, at the processor, the service advertisement based on the determined frame delivery information;

transmitting, from the network interface, the modified service advertisement to the one or more invitees associated with the plurality of access points; and subsequently restricting content to the output resource to the one or more invitees with OpenFlow by:

transmitting, from the SDN controller device, an OpenFlow rule executed at a layer-2 data plane specifying service advertisement frames to be dropped at the access point after being broadcast; and suppressing, at the access point implementing the OpenFlow rule generated at the Wi-Fi controller, service advertisements from being broadcast to excluded stations at the plurality of access points, wherein frames are dropped from a data plane based on the OpenFlow rule by the plurality of access points, wherein the output resource displays content provided by an invitee device when under control of the invitee device, and the output resource moves transparently during a meeting from the access point to a second access point of the plurality of access points.

\* \* \* \* \*